No. 665,311. Patented Jan. 1, 1901.
G. H. BURROWS.
INCANDESCENT GAS LIGHT APPARATUS.
(Application filed June 23, 1900.)
(No Model.) 2 Sheets—Sheet 2.
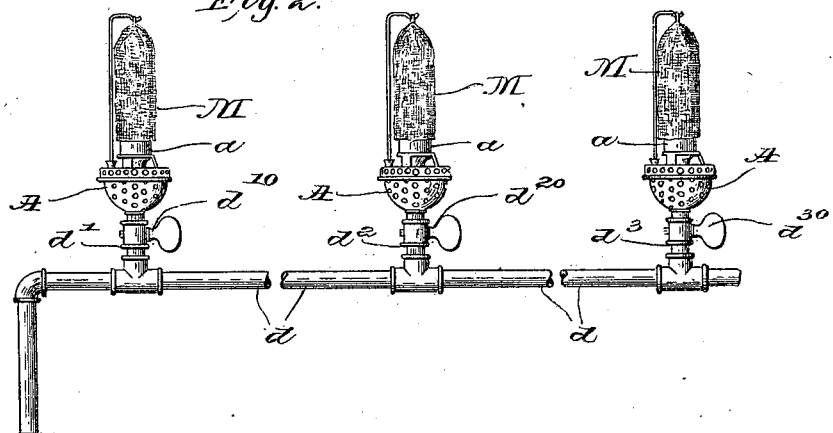
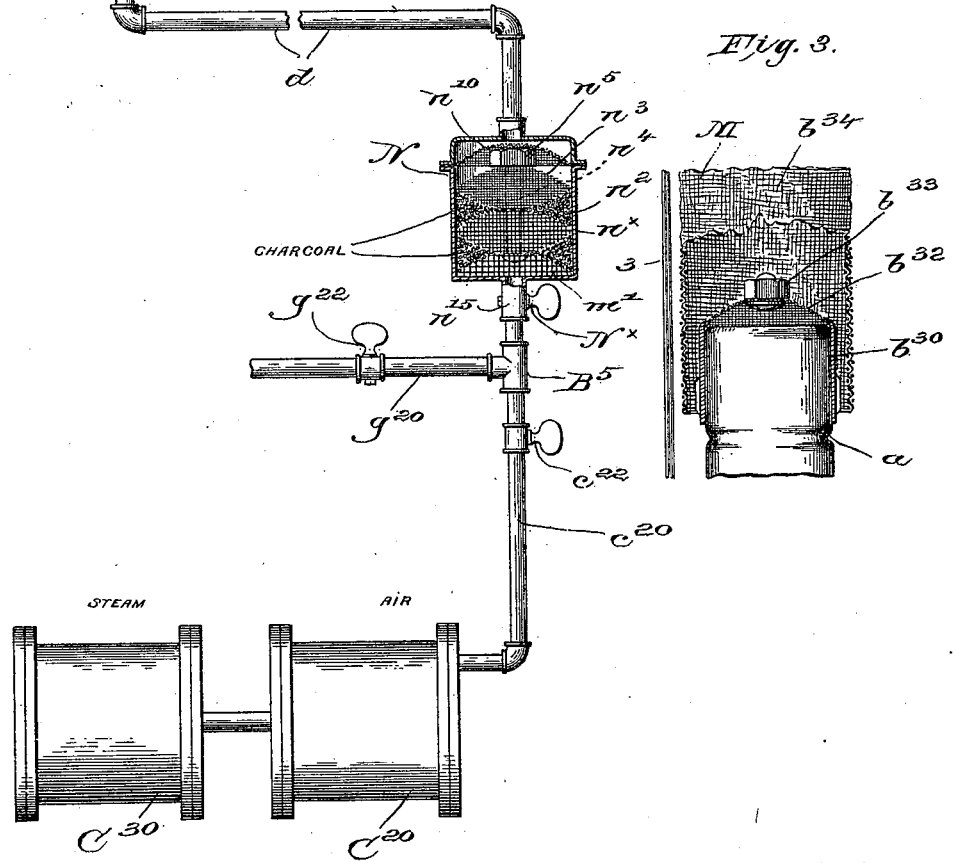
Witnesses,
W. C. Lunsford.
Thomas J. Drummond.
Inventor:
George H. Burrows.
by Crosby Gregory.
atty's.

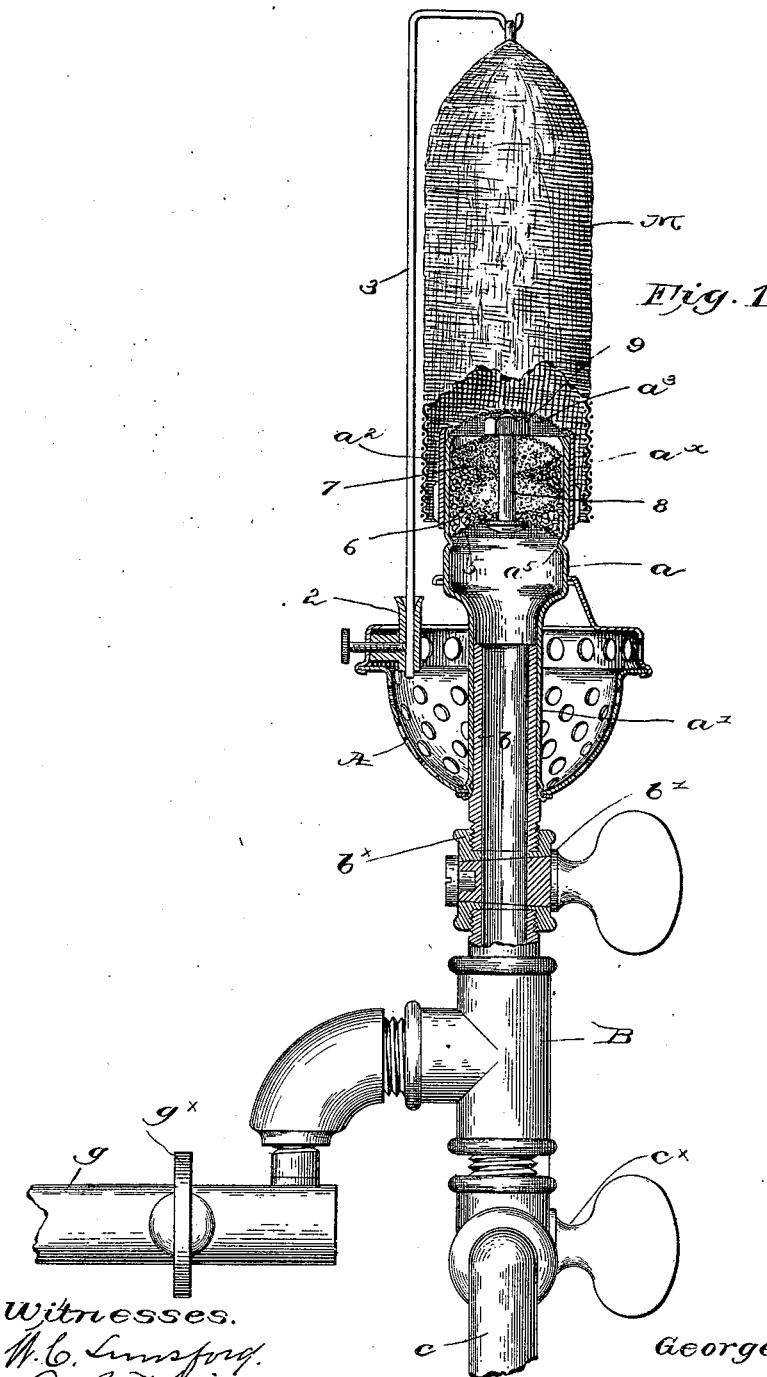

UNITED STATES PATENT OFFICE.

GEORGE H. BURROWS, OF SOMERVILLE, MASSACHUSETTS, ASSIGNOR TO THE INCANDESCENT GAS LIGHT COMPANY, OF BOSTON, MASSACHUSETTS.

INCANDESCENT-GAS-LIGHT APPARATUS.

SPECIFICATION forming part of Letters Patent No. 665,311, dated January 1, 1901.

Application filed June 23, 1900. Serial No. 21,262. (No model.)

*To all whom it may concern:*

Be it known that I, GEORGE H. BURROWS, a citizen of the United States, residing at Somerville, county of Middlesex, State of Massachusetts, have invented an Improvement in Incandescent-Gas-Light Apparatus, of which the following description, in connection with the accompanying drawings, is a specification, like characters on the drawings representing like parts.

This invention relates to apparatus for so-called "incandescent gas-lighting," wherein the light is provided by the incandescence of a mantle of refractory material, produced by the combustion of a gaseous mixture; and my invention has for one of its objects the production of means whereby a light of great intensity and power is produced by the combustion of a mixture containing a very small percentage of gas.

Another object of my invention is to provide for the better distribution of the ignited gas to the mantle to effect a more brilliant and complete incandescence thereof.

In practicing my invention I may use any well-known incandescing mantle—such as the "Welsbach" type, for instance—and between the burner-exit and the inlets for air and gas I provide a mixer of peculiar and novel construction, to be hereinafter described, and I also employ air under pressure, preferably slightly greater than the pressure of the gas, the latter being ordinary illuminating-gas usually furnished for lighting.

By means of my invention I obtain a light of wonderful strength and brilliancy, so much so, indeed, that with the present development of my invention the apparatus is adapted for street-lighting or the illumination of large halls or rooms, as well as for use in private houses.

The various novel features of my invention will be hereinafter described, and particularly pointed out in the following claims.

Figure 1 is a vertical sectional view of an incandescent-gas-lighting apparatus embodying my invention, shown as applied to an individual burner. Fig. 2 is a view of a system embodying my invention, a number of burners utilizing a common mixer; and Fig. 3 is an enlarged partly-sectional view of one of the burners which I prefer to use in such embodiment of my invention, the usual end cap of the burner being omitted.

Referring to Fig. 1, wherein the mixer is shown adapted for use with an individual burner, I have shown a tubular chamber $a$ on the upper end of or forming a continuation of a tube $a'$, the upper portion $a^x$ of the chamber constituting a mixer, as will be described. A removable sleeve-like cap $a^2$, having a foraminous screen $a^3$, preferably made of fine wire-gauze, is slipped over the upper end of the chamber and constitutes the burner, a shade-holder A, secured to the tube $a'$, having a socket 2 to receive the supporting-standard 3 of an incandescing mantle M, of any suitable or well-known construction—such, for instance, as a Welsbach mantle—the lower end of the mantle surrounding the burner. The tubular outlet $b$ of a valve-case $b^x$ extends into the lower end of and supports the tube $a'$ and connected parts, a plug-valve or other suitable controlling-cock $b'$ being mounted in the valve-case $b^x$, which latter is shown as secured to a T-coupling, communicating by the conduits $g$ and $c$ with suitable sources of supply for gas and air, respectively.

The gas-supply can be the usual main; but I prefer to use air under pressure slightly greater than the gas-pressure, and the air is conveyed by the conduit $c$ from a suitable pump or compressing device. The conduits are provided, respectively, with controlling-valves $g^x$, $c^x$, by which the proportions of gas and air can be regulated to provide the proper mixture for combustion at the burner.

In order to attain the highest efficiency, it is necessary to thoroughly mix the air and gas before reaching the burner, and this is particularly necessary when air under pressure is employed, and I have devised a novel and very efficient mixer.

Referring to Fig. 1, I have shown the chamber $a^x$ as provided with a series of arched foraminous diaphragms made, preferably, of wire-netting of different degrees of fineness. The lowermost diaphragm 5 and the coarsest is placed with its convex face uppermost, and it is supported at its edge by an annular rib $a^5$ on the inner wall of the chamber $a^x$. Two oppositely-arched diaphragms 6, placed with their annular edges together, form a hollow convexo-convex partition resting on the diaphragm 5, the material of said diaphragms being of finer mesh than the bottom diaphragm, and a second still finer meshed and similar partition is located near the top of the chamber formed by the diaphragms 7. A bolt 8, extended upward through said several diaphragms, is threaded at its upper end, which projects above the uppermost diaphragm 7 and has thereon a polygonal spreader, (shown as a nut 9.) Within the partitions I prefer to place crystalline material not affected by the action of gas, such as quartz crystals, and between the partitions and the walls of the chamber $a^\times$ the space is filled in with granular matter, preferably charcoal. I thus provide a permeable barrier in the chamber through which the entering gas and air must pass in various and multitudinous tortuous channels, so that the air and gas are most thoroughly and intimately mixed before reaching the burner. The barrier retards the flow of the gaseous mixture, and thus gives sufficient time for the effective and uniform mixing to take place.

The arching of the diaphragms enables me to press the edges thereof tightly against the cylindrical inner wall of the chamber $a^\times$ by means of the bolt 8, to thereby prevent the rapid and more uninterrupted flow of air and gas near the wall. In order to secure a thoroughly and uniformly mixed column of air and gas at the outlet of the burner, it is obviously necessary to prevent the presence of passages or channels in the mixing-chamber which would permit a more uninterrupted flow of air or gas therethrough than at other portions of the chamber.

Supposing now that with the apparatus shown it is desired to operate the same, gas is turned on by the valve $g^\times$, and when it issues at the burner it is lighted, after which the valve $c^\times$ is turned to admit air under pressure. The air and gas valves are then adjusted until the flame burns clearly and almost invisible in daylight if the mantle be removed, and I have found that with the forced draft or air under pressure and the thorough mixing ten per cent. of gas is amply sufficient for the mixture, a most intense and thorough incandescence of the mantle being effected. After the gas and air valves have been once adjusted they are permitted to remain as adjusted, and the valve or cock $b'$ is used for service purposes to turn on the gaseous mixture or shut it off without any disturbance of the individual gas and air controlling means.

I make the spreader polygonal in order to present a number of flat faces rather than an annular surface, as such flat faces serve to compact or condense and direct the lower part of the flame in a series of powerful jets upon the lower portion of the mantle, and by turning the spreader up on the bolt 8 the foraminous diaphragms are flattened somewhat, decreasing their permeability and that of the mixer as a whole, as well as compressing the granular material hereinbefore referred to, such flattening of the diaphragms setting them tightly in the chamber, as set forth.

The mixer not only effects a thorough mixture of the air and gas, but it renders noiseless the exit of the mixture to the burner, preventing all singing, hissing, or roaring, which would tend to be present with the forced draft.

A number of burners, each having its own individual mixer, may be used, or a series of burners may be connected with a common mixer between them and the sources of air and gas, such arrangement being shown in Fig. 2.

The mantle M, shade-holder A, and chamber $a$ for each burner may be substantially as described; but the several burners are connected by unions $d'$ $d^2$ $d^3$ with a service-pipe or conduit $d$, each burner having its own service-valve, as $d^{10}$ $d^{20}$ $d^{30}$.

The mixer N, Fig. 2, is constructed substantially as described, it comprising a peripherally-tubular chamber $n^\times$, having foraminous diaphragms $n'$ $n^2$ $n^3$ therein arranged and constructed as before, with a bolt $n^4$ and nut $n^5$ for varying the permeability, and the crystalline material and granulated charcoal are used as before. The service-pipe $d$ is connected with the outlet end of the chamber, and I may use a screen $n^{10}$, if desirable, between the end of the pipe and the first adjacent diaphragm.

A T-coupling $B^5$ is coupled to a valve-case $n^{15}$ at the inlet end of the mixer, said case having a main shut-off valve $N^\times$, which is thus located between the mixer and the coupling $B^5$, the latter being connected with the gas-supply by a pipe $g^{20}$, having a controlling-valve $g^{22}$, and also by a pipe $c^{20}$ with the source of air under pressure—such, for instance, as a pump comprising an air-compressing chamber or cylinder $C^{20}$ and a suitable steam-cylinder $C^{30}$, a valve $c^{22}$ controlling the passage of the air to the mixer.

Any suitable form of air-compressing device may be used driven by any suitable form of power—such as steam, water, &c.—the manner of obtaining the air under pressure being entirely immaterial so far as my invention is concerned.

The gas-valve 22 is first turned on, the valve $N^\times$ being open, and after the gas at the burners has been lighted the air is admitted by means of the valve $C^{22}$, and when the proper proportion of air and gas is attained by manipulating the valves $g^{22}$ $c^{22}$ further passage of the mixture to the burners, first passing through the mixer N, is controlled entirely by the main service-valve $N^\times$. When using my invention in this manner, I prefer to provide each burner with a spreader, as shown in enlarged detail in Fig. 3, the cap $b^{30}$ having mounted upon its gauze end $b^{32}$ a polygonal spreader or nut $b^{33}$, which is screwed upon a short bolt $b^{34}$, the threaded end of which is passed through the gauze, the flat faces of the spreader directing the flame upon the adjacent portion of the mantle M, the spreader in such construction performing the same function as hereinbefore set forth; but the spreader will be protected by an external gauze cover, as shown in Fig. 1, when the burner is in use.

My invention is not restricted to the precise construction and arrangement herein shown and described, as the same may be varied or modified in different particulars without departing from the spirit and scope of my invention.

Having fully described my invention, what I claim as new, and desire to secure by Letters Patent, is—

1. In apparatus of the class described, a tubular burner having a foraminous outlet, an incandescing mantle, supply-inlets for gas, and for air under pressure, and a mixer interposed between said inlets and the burner, said mixer including a chamber, a series of arched foraminous diaphragms therein, and means to press the edges of the diaphragms tightly against the wall of the chamber.

2. In apparatus of the class described, a burner provided with a mantle, a mixer, means to regulate the action of the mixer upon the gas and air independently of the supply of either gas or air, and means to supply gas, and air under pressure, to the mixer.

3. In apparatus of the class described, a burner provided with an incandescing mantle, means to supply a combustible gas thereto, and a polygonal spreader adjacent the burner to direct the lower portion of the flame laterally upon the mantle.

4. In apparatus of the class described, a mixing-chamber having air and gas inlets, and a plurality of arched foraminous diaphragms in said chamber between its outlet and the air and gas inlets, adjacent diaphragms being oppositely arched, and means to flatten the diaphragms and thereby press their edges against the wall of the chamber.

5. In apparatus of the class described, a mixing-chamber having air and gas inlets, a plurality of foraminous diaphragms therein, granular material interposed between the diaphragms, and means to vary the permeability of the mixer.

6. In apparatus of the class described, a mixing-chamber having air and gas inlets, a plurality of arched, foraminous diaphragms in the chamber, adjacent diaphragms being oppositely arched, and granular material interposed between the convex faces of adjacent diaphragms.

7. In apparatus of the class described, a mixing-chamber, a plurality of arched foraminous diaphragms therein, adjacent diaphragms being oppositely arched, and means to vary the curvature of the diaphragms.

8. In apparatus of the class described, a mixing-chamber, a plurality of arched foraminous diaphragms therein, adjacent diaphragms being oppositely arched, granular material interposed between the convex faces of adjacent diaphragms, and means to vary the permeability of the mixer.

9. In apparatus of the class described, a tubular mixing-chamber, a series of circular arched foraminous diaphragms within the chamber dividing it into compartments, means to press the edges of the diaphragms tightly against the wall of the chamber, and granular material in the compartments formed by the diaphragms.

10. In apparatus of the class described, a burner, air and gas supplies, a chamber between them and the burner and containing a permeable barrier, to effect thorough mixture of air and gas and to prevent noisy escape of the mixture to the burner, and means to adjust the permeability of the barrier.

11. In apparatus of the class described, a mixing-chamber having an inlet for air and gas, two hollow convexo-convex partitions therein made of wire-gauze, a packing of granular carbonaceous material exterior to said partitions, quartz crystals within the partitions, and an outlet for the thoroughly-mixed air and gas.

In testimony whereof I have signed my name to this specification in the presence of two subscribing witnesses.

GEORGE H. BURROWS.

Witnesses:
MARGARET A. DUNN,
MABEL PARTELOW.